United States Patent [19]
Galperin

[11] Patent Number: 5,384,982
[45] Date of Patent: Jan. 31, 1995

[54] SENSING DEVICE HAVING UNIVERSAL INTERFACE FOR COOPERATION WITH PLURALITY OF DOOR ACTUATORS

[75] Inventor: Anatoly Galperin, Philadelphia, Pa.

[73] Assignee: Miller Edge, Inc., Concordville, Pa.

[21] Appl. No.: 54,580

[22] Filed: Apr. 29, 1993

[51] Int. Cl.⁶ .............................................. E05F 15/02
[52] U.S. Cl. .......................................... 49/27; 49/28; 200/61.43
[58] Field of Search ............... 49/26, 27, 28; 200/61.43

[56] References Cited

U.S. PATENT DOCUMENTS

| | | | |
|---|---|---|---|
| 3,462,885 | 8/1969 | Miller | 49/27 |
| 3,855,733 | 12/1974 | Miller | 49/27 |
| 4,273,974 | 6/1981 | Miller | 49/27 |
| 4,369,344 | 1/1983 | Diamond | 49/27 |
| 4,972,054 | 11/1990 | Miller et al. | 200/61.43 |
| 5,027,552 | 7/1991 | Miller et al. | 49/27 |
| 5,079,417 | 1/1992 | Strand | 49/27 |
| 5,142,822 | 9/1992 | Beckerman | 49/27 |
| 5,148,911 | 9/1992 | Miller et al. | 200/61.43 |
| 5,191,268 | 3/1993 | Duhame | 49/26 |
| 5,239,146 | 8/1993 | Biubaugh | 49/26 |

Primary Examiner—Michael J. Milano
Attorney, Agent, or Firm—Panitch Schwarze Jacobs & Nadel

[57] ABSTRACT

A sensing device for use with a door movable in a first direction by an actuator is employed to stop or reverse the direction of movement of the door upon a force being applied to the sensing device by an object in the path of movement of the door. The sensing device comprises a sensing edge for being secured to the door. The sensing edge includes a generally flexible elongated sheath and a pair of generally parallel spaced contact members disposed within the sheath. The contact members are electrically connected to the actuator. A termination circuit is electrically connected to the contact members for generally continuously generating an installer selected predetermined output which is applied through the contact members to the actuator to enable operation of the actuator for movement of the door in the first direction. Upon the application of a force to the sensing edge, the contact members contact each other to prevent the output from the termination circuit from being applied to the actuator thereby causing the actuator to stop or reverse the direction of movement of the door.

15 Claims, 4 Drawing Sheets

SENSING DEVICE HAVING UNIVERSAL INTERFACE FOR COOPERATION WITH PLURALITY OF DOOR ACTUATORS

FIELD OF THE INVENTION

The present invention relates to a sensing device for controlling the movement of a door by sensing the presence of an object in the path of the door during closing and, more particularly, to such a sensing device which includes an interface to permit installer selectable operation with a plurality of differing door actuators.

BACKGROUND OF THE INVENTION

Sensing edges have been used for a long time in commercial applications. In such commercial applications, a sensing edge is secured to the leading edge of a door, typically an overhead-type door which is opened and closed utilizing a motor-powered actuator. Such prior sensing edges generally include some form of switch means or switch extending substantially along the entire length of the leading edge of the door such that if an object is in the path of a closing door, pressure from the object is applied to the sensing edge to either make or break electrical contact within the switch. The sensing edge is connected to the door actuator in such a manner that the making or breaking of contact by the switch within the sensing edge results in the actuator either immediately stopping further closing movement of the door or immediately reversing movement of the door.

While sensing edges of this type have been in use in the industrial and commercial sector for a substantial period of time, until recently, sensing edges of this type have not been used in the residential area. The U.S. government has now acted to require that residential garage door openers include some type of quick acting sensor for the purpose of stopping the lowering or closing of a residential garage door or reversing the downward or closing movement of a residential garage door when an object or person is located within the path of the garage door. As a result, manufacturers of residential garage door openers have designed, redesigned or modified their products in order to permit a sensing edge or other sensing device to be employed for this purpose. Most of the new or modified automatic garage door openers which are now on the market employ a "fail safe" system in which the garage door opener or actuator is required to continuously receive some type of predetermined signal from the sensing edge or other sensing device employed. Thus, whenever there is any interruption in the predetermined signal, the garage door opener/actuator immediately stops the closing of a garage door or reverses the closing garage door.

Unfortunately, no governmental or universal standards were developed for the predetermined signal which the various garage door opener/actuators must receive in order to permit continued normal (fail-safe) operation. Thus, each of the residential garage door opener manufacturers have developed its own signal which its own garage door opener/actuator must receive for continued normal operation. The signals vary greatly from manufacturer to manufacturer. The opener/actuators of some manufacturers must receive a generally continuous voltage between predetermined minimum and/or predetermined maximum voltage levels which vary from manufacturer to manufacturer. The opener/actuators of other manufacturers are more sophisticated in that they must receive a generally continuous pulse train of individual pulses having differing maximum and minimum voltages and having differing periods, pulse widths, etc. Thus, it was necessary to develop a separate sensing edge adapted to provide the necessary signal for each different manufacturer's garage door opener/actuator.

The present invention relates to a single sensing device which includes a sensing edge and an electrical circuit, called a termination circuit, which serves as a universal interface so that the sensing device can be utilized with the garage door opener/actuator of various manufacturers. The use of the present invention is advantageous in that it precludes the necessity for designing, developing and producing a plurality of individual sensing edges, each adapted for use with a separate manufacturer's garage door opener/actuator.

SUMMARY OF THE INVENTION

Briefly stated, the present invention comprises a sensing device for use with a door movable in a first direction by an actuator to stop or reverse the direction and movement of the door upon a force being applied to the sensing device by an object in the path of movement of the door. The sensing device comprises a sensing edge for being secured to the door, the sensing edge including a generally flexible elongated sheath and a pair of generally parallel, spaced contact members disposed within the sheath, the contact members being electrically connected to the actuator. A termination circuit is also electrically connected to the contact members. The termination circuit generally continuously generates a predetermined output signal which is applied through the contact members to the actuator to enable operation of the actuator for movement of the door in the first direction. Upon application of a force to the sensing edge, the contact members contact each other to prevent the output signal from the termination circuit from being applied to the actuator thereby causing the actuator to stop or reverse the direction of movement of the door.

BRIEF DESCRIPTION OF THE DRAWINGS

The foregoing summary, as well as the following detailed description of a preferred embodiment, will be better understood when read in connection with the appended drawings. For the purpose of illustrating the invention, there is shown in the drawings an embodiment which is presently preferred, it being understood, however, that the invention is not limited to the specific methods and instrumentalities disclosed. In the drawings.

DETAILED DESCRIPTION OF PREFERRED EMBODIMENT

Figure 1:
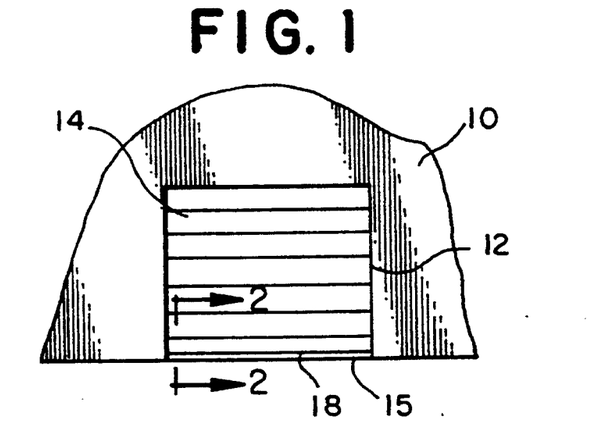
FIG. 1 is a front elevational view showing a door construction including a sensing device in accordance with the present invention.

Referring to the drawings in detail, wherein like numerals indicate like elements throughout, there is shown in FIG. 1 a wall 10 having a doorway 12 provided with a door 14. For purposes of illustration, the door 14 is shown as an overhead door, such as a residential garage door, having a sensing device 15 in accordance with the present invention along its lower side or leading edge 18. However, one of ordinary skill in the art would understand that the sensing device 15 may be located along any edge of any door structure, such as vertically or horizontally movable doors (not shown), without departing from the spirit and scope of the present invention.

Figure 3:
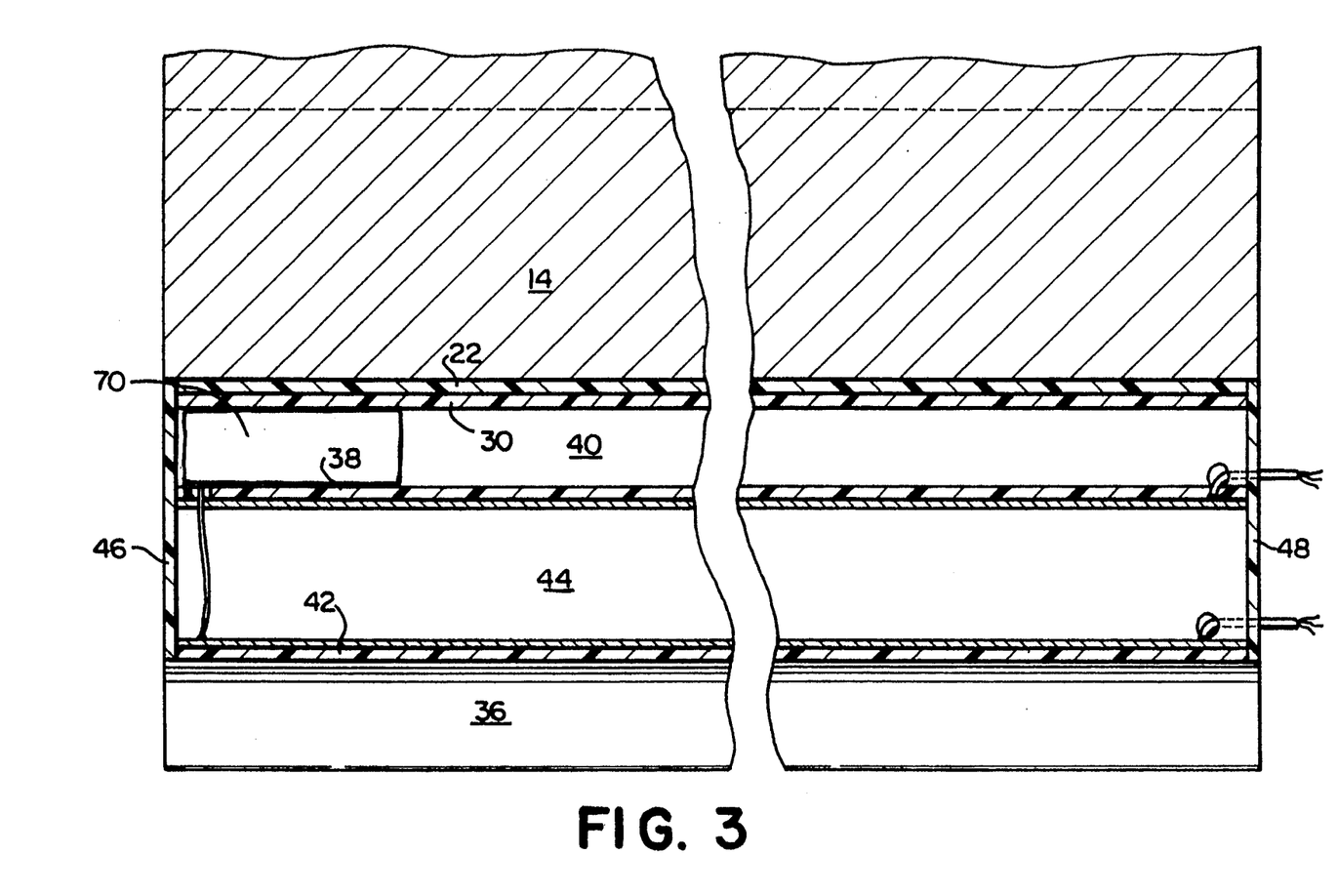
FIG. 3 is a sectional view of the sensing device of FIG. 2.

As shown in FIG. 3, the sensing device 15 extends substantially along the entire length of the leading edge 18 of the door 14. The sensing device 15 controls downward movement of the door 14 by actuating a door movement device (hereinafter described), such as an automatic garage door opener or actuator upon a force being applied to the sensing device 15. As shown in FIG. 1, the door 14 is capable of movement in a generally vertical direction in a plane generally parallel to that of the wall 10. For example, when the door 14 and sensing device 15 are moving in a generally downward direction, if the sensing device 15 encounters an obstructing object or article (not shown) at the leading edge 18, the sensing device 15 senses the presence of the obstructing article and actuates the actuator to stop the downward movement of the door 14 or to change the direction of movement of the door 14, i.e., to a generally upward direction, as described in more detail hereinafter.

Figure 2:
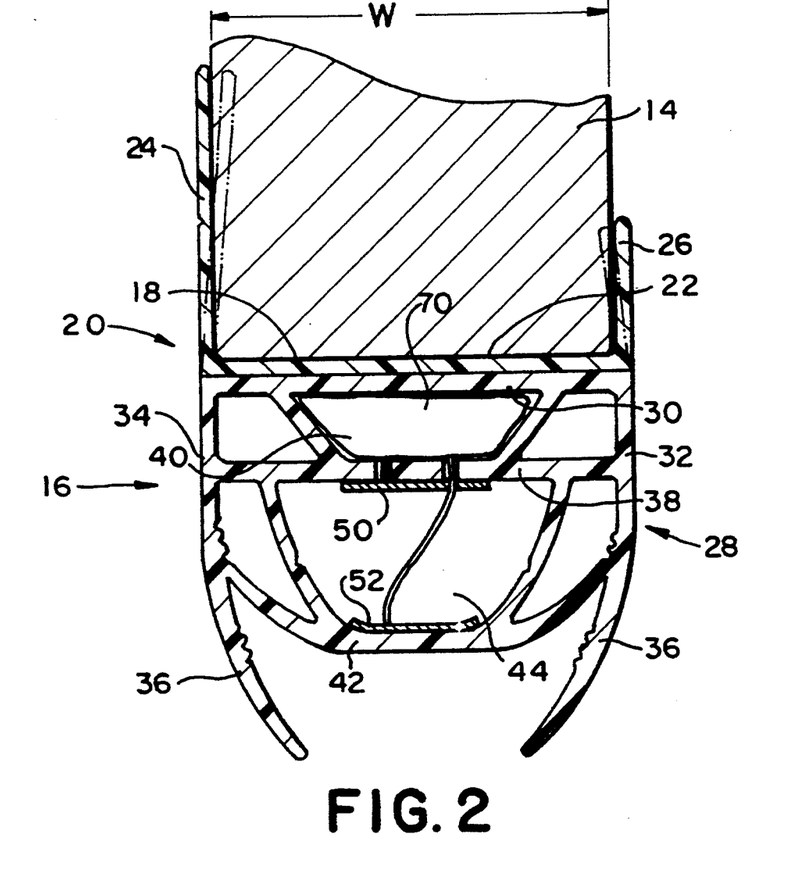
FIG. 2 is a greatly enlarged cross-sectional view of the sensing device of FIG. 1 taken along line 2—2 of FIG. 1.

Referring now to FIG. 2, the sensing device 15 includes a sensing edge 16 of a type well known in the art and comprised of a generally rigid elongated base member 20. The base member 20 is designed to clamp onto the leading edge 18 of the door 14. The base member 20 includes a mounting plate 22 for being attached to the leading edge 18 of the door 14. The mounting plate 22 has a first or upper generally planar surface and a parallel second or lower generally planar surface.

A first elongated clamping member 24 extends from a first end of the mounting plate 22 to form an angle between the first elongated clamping member 24 and the mounting plate 22. The angle is preferably less than about 90 degrees, and more preferably about 80 degrees (as shown in phantom in FIG. 2) prior to clamping the base member 20 onto the leading edge 18 of the door 14. A second elongated clamping member 26 extends outwardly from a second end of the mounting plate 22 toward the first clamping member 24 for receiving the leading edge 18 of the door 14 therebetween. The angle formed between the mounting plate 22 and the second clamping member 26 is preferably less than about 90 degrees, and more preferably about 80 degrees (as shown in phantom in FIG. 2) prior to clamping the base member 20 onto the leading edge 18 of the door 14. After the base member 20 is clamped or snapped onto the leading door edge 18, the angles are preferably each about 90 degrees, although one of ordinary skill in the art would understand that the angles may be varied, as desired, and are dictated by the external configuration of the leading edge 18 of the door 14.

The first and second clamping members 24, 26 and the mounting plate 22 form a generally trihedrally shaped base member 20 wherein the distance between the distal ends of the first and second clamping members 24, 26 is at least slightly less than the width W of the leading edge 18 of the door 14. It is preferred that the base member 20 be constructed of a polymeric material having sufficient flexibility such that the first and second clamping members 24, 26 can be forced slightly outwardly to receive the leading edge 18 of the door 14. In other words, the first and second clamping members 24, 26 are biased inwardly such that once the leading edge 18 of the door 14 is positioned therebetween, the first and second clamping members 24, 26 exert an inwardly directed clamping force on the door 14 to firmly grip and thereby secure the base member 20 to the door 14, as illustrated in FIG. 2. One of ordinary skill in the art would understand, however, that the base member 20 may alternatively or additionally be attached to the leading edge 18 of the door 14 by standard fasteners, such as nails, bolts, screws, tacks, or an adhesive or other fastener means without departing from the spirit and scope of the present invention.

As best shown in FIG. 2, the sensing edge 16 further includes a generally flexible elongated sheath 28, preferably having a generally constant cross-sectional outline configuration. The sheath 28 extends along an axis generally parallel to the leading edge 18 of the door 14. As presently preferred, the sheath 28 has a generally semi-oval cross-section, but one of ordinary skill in the art would understand that any other suitable cross-sectional shape, such as circular, semi-circular, elliptical, rectangular, or square (not shown), may be used in accordance with the present invention.

The sheath 28 includes a generally elongated first wall 30 having a first or upper surface and a second or lower surface. The upper surface of the first wall 30 is secured to the base member 20. Preferably, the sheath 28 is coextruded with the base member 20 such that the upper surface of the first wall 30 is bonded to the lower surface of the mounting plate 22 of the base member 20.

As best shown in FIG. 2, a first leg 32 and a second leg 34 extend downwardly from the lower surface of the first wall 30. Preferably, the distal ends of both the first leg 32 and the second leg 34 are generally arcuate in cross section and the proximate ends thereof extend generally perpendicularly from the first wall 30. Each of the first leg 32 and second leg 34 preferably include flexible members 36 which form the distal ends thereof. The flexible members 36 gradually decrease in thickness from the end adjacent to the first wall 30. However, the flexible members 36 could alternatively be uniform in thickness. The flexible members 36 are preferably constructed to be flexible enough to permit the sensing edge 16 to detect an obstructing article but stiff enough to abut and seal an adjacent surface (not shown) when the door 14 is in a closed position without actuating the sensing edge 16. That is, when the door 14 is in a closed position, the flexible members 36 are inclined toward one another as illustrated in FIG. 2 and form a seal between the sensing edge 16 and the adjacent surface (not shown). The seal prevents air currents from entering or exiting through the gap created between the leading edge 18 of the door 14 and the adjacent surface.

The sheath 28 includes a generally elongated second wall 38 having a first or upper surface and a second or lower surface. The second wall 38 is located generally parallel to and spaced from the first wall 30 to define a first cavity 40 therebetween. The second wall 38 has a first end connected to the first leg 32 and a second end connected to the second leg 34. The sheath 28 preferably includes a pair of spaced, generally angled first cavity reinforcing walls positioned within the first cavity 40. Each first cavity reinforcing wall has a first edge secured to the lower surface of the first wall 30 and a second edge secured to the upper surface of the second wall 38 to establish outer sub-cavities which insulate the central portion of the first cavity 40 and provide a vapor and moisture barrier.

The sheath 28 includes a third wall 42 having an upper surface and a lower surface. The third wall 42 is located generally parallel to (at least in part) and spaced from the second wall 38 to define a second cavity 44 therebetween. The third wall 42 has a first end connected to the first leg 32 and a second end connected to the second leg 34. Preferably, the sheath 28 includes a pair of spaced, generally angled second cavity reinforcing walls positioned within the second cavity 44. The second cavity reinforcing walls each have a first edge secured to the lower surface of the second wall 38 and a second edge secured to the upper surface of the third wall 42 to establish outer sub-cavities which insulate the central portion of the second cavity 44 and provide a vapor and moisture barrier.

As best shown in FIG. 3, it is preferred that end walls 46, 48 close and seal each end of the sheath 28 to thereby form an enclosed moisture-proof area for receiving at least a portion of a switch means. As best shown in FIG. 2, a switch means is positioned within the second cavity 44 between the second wall 38 and the third wall 42. In the present embodiment, it is preferred that the switch means be comprised of a first flexible, electrically conductive contact member 50 having a first or upper surface and a second or lower surface. As best shown in FIG. 3, the first contact 50 includes a first end and a second end. Referring now to FIG. 2, the first contact member 50 is positioned within the second cavity 44 between the second and third walls 38, 42 with the upper surface of the first contact member 50 in facing engagement with and preferably bonded to the lower surface of the second wall 38.

The switch means preferably further includes a second flexible, electrically conductive contact member 52 having a first or upper surface and a second or lower surface. As shown in FIG. 3, the second contact member 52 includes a first end and a second end. The second contact member 52 is positioned between the second wall 38 and the third wall 42, with the lower surface of the second contact member 52 in facing engagement with and preferably bonded to the upper surface of the third wall 42 in the vicinity of the flattened central portion thereof. Upon application of external pressure to the sheath 28, a portion of the upper surface of the second contact member 52 deflects into the second cavity 44 towards the first contact member 50 and engages and makes electrical contact therewith.

The sensing edge 16 as thus far described is typical of sensing edges well known to those skilled in the art. Further details concerning the structure and operation of the sensing edge 16 may be obtained by reference to U.S. patent applications Ser. Nos. 07/881,903, filed May 12, 1992; and 07/941,502, filed Sep. 8, 1992, both entitled "Sensing Edge". It should be appreciated by those skilled in the art that the sensing edge 16, while presently preferred for residential use, is but one of many sensing edges which may be employed as part of the present invention. Thus, it should be clearly understood that the present invention is not limited to the use of a sensing edge having the above-described characteristics.

Figure 6:
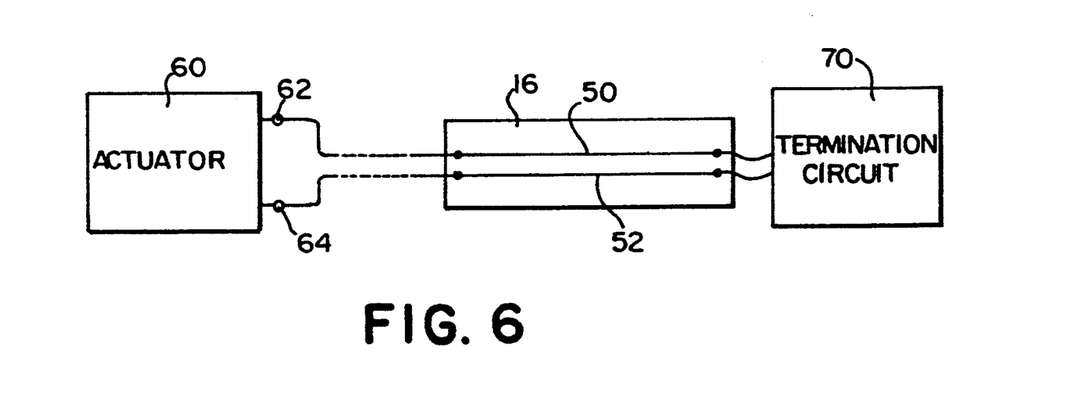
FIG. 6 is a block diagram schematic illustrating the operation of the sensing device in accordance with the present invention.

FIG. 6 illustrates schematically the basic structure and operation of the presently preferred embodiment of the invention. An actuator 60 of the type produced and sold by any one of a variety of manufacturers includes a pair of spaced output terminals 62, 64. The actuator 60 functions to open and close a door, such as a residential garage door 14 in a manner well known in the art. The actuator 60 includes circuitry (not shown) also of a type well known in the art for providing a predetermined open circuit voltage between or across the actuator output terminals 62, 64. The output voltage may be an A.C. voltage or a D.C. voltage, and the amplitude of the output voltage may vary greatly from manufacturer to manufacturer. A common actuator output terminal voltage provided by several manufacturers is a generally continuous D.C. voltage within the range of 6 to 30 volts.

As previously discussed, manufacturers of residential garage door openers have designed "fail safe" products which are only operable as long as the voltage which appears across the output terminals 62, 64 meets certain predetermined criteria. With some manufacturers, the voltage across the output terminals 62, 64 must generally continuously remain within a generally predetermined voltage range having a predetermined maximum voltage and a predetermined minimum voltage. In general, the predetermined maximum voltage is less than the open circuit voltage across the output terminals, and the predetermined minimum voltage is generally greater than zero. In other words, each such manufacturer is looking for a sensing device having an impedance which when placed across the actuator output terminals 62, 64 changes the open circuit output voltage to be within the desired predetermined voltage range. Any substantial deviation at the actuator output terminals 62, 64 from the desired voltage range (either above or below) effectively disables the actuator either preventing the actuator from closing the door or, in the case of some actuators, reverses the closing motion of the door.

Other actuator manufacturers establish a predetermined open circuit voltage across the output terminals 62, 64 but expect to see the output voltage generally continuously vary in a predetermined manner, typically in the form of a square wave having a predetermined minimum voltage, a predetermined maximum voltage, a predetermined period, and predetermined pulse widths for both the maximum voltage and the minimum voltage. Of course, factors such as the pulse width, minimum and maximum voltage, etc., vary from manufacturer to manufacturer.

The present sensing device 15 includes a circuit, generally referred to as a termination circuit 70, which functions in conjunction with the sensing edge 16 to vary the voltage at the actuator output terminals 62, 64 in a manner acceptable to substantially all of the major residential garage door opener manufacturers. The termination circuit 70 is electrically connected to the first and second contact members 50, 52 within the sensing edge 16. The first and second contact members 50, 52 are also electrically connected across the actuator output terminals 62, 64 as shown. It should be understood by those skilled in the art that while in the embodiment shown in FIG. 6, a first end of each of the contact members 50, 52 is preferably electrically connected to the actuator output terminals 62, 64, and a second end of the first and second contact members 50, 52 is preferably connected to the termination circuit to maintain fail-safe operation, the termination circuit 70 could be connected at substantially any point along the first and second contact members 50, 52 even at the first end. Additionally, if desired, the actuator output terminals 62, 64 could be connected at any point along the length of the contact members 50, 52. All that is necessary is that the termination circuit 70 and the actuator output terminals 62, 64 be connected so that the termination circuit 70 may effectively vary the output voltage of the actuator output terminals 62, 64 as long as the first and second contact members 50, 52 of the sensing edge 16 remain apart. As will be apparent to those skilled in the art, upon the sensing edge 16 coming into contact with an object in front of the leading edge of a closing door, the contact members 50, 52 contact each other, thereby effectively short circuiting the actuator output terminals 62, 64 causing the voltage therebetween to diminish to zero or near zero and, in any event, outside of the predetermined range required by the actuator 60 for continued (closing) operation.

Figure 7:
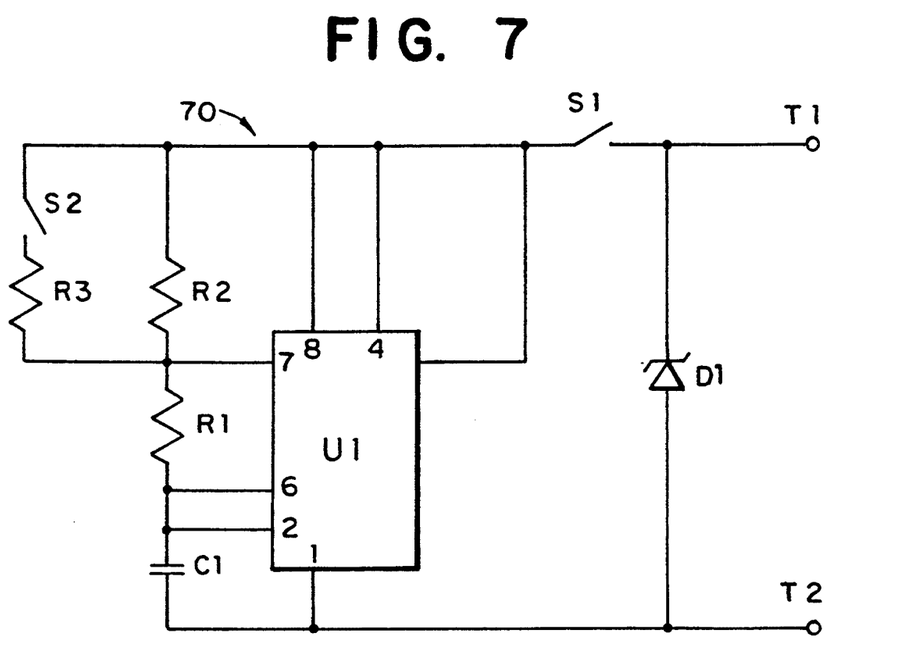
FIG. 7 is an electrical schematic illustrating the preferred structure of the termination circuit of FIG. 4.
Figure 8A:
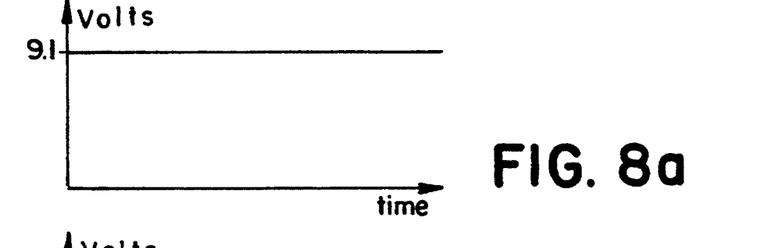
FIGS. 8a, 8b and 8c are timing diagrams illustrating output signals of the termination circuit of FIG. 7.

FIG. 7 is an electrical schematic diagram of a preferred embodiment of the termination circuit 70. The termination circuit 70 includes a first switch S1 and a second switch S2, the positions of each of which are selected by an installer of the sensing device 15 depending upon the particular manufacturer of the actuator 60 with which the sensing device 15 is to be employed. The circuit further includes a Zener diode D1 which, in the present embodiment, is a 9.1 volt Zener diode. In analyzing all of the major garage door opener manufacturers which desire a generally continuous voltage to appear across the actuator output terminals 62, 64, most require a maximum voltage level in excess of 9.1 volts and a minimum voltage level which is less than 9.1 volts. Hence, when the circuit shown in FIG. 7 is employed as a termination circuit in the manner illustrated with switch S1 open, the termination circuit 70 effectively applies the Zener diode D1 across the actuator output terminals 62, 64 to effectively maintain approximately a constant 9.1 volts across the actuator output terminals 62, 64 as shown in FIG. 8a as long as the first and second contact members 50, 52 of the sensing edge 16 remain apart. It will be appreciated that other devices and other voltages may be selected if desired.

Figure 8B:
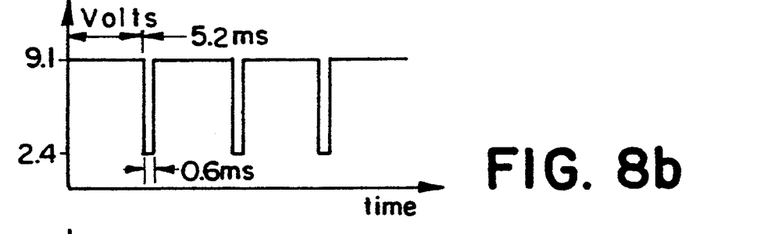

The termination circuit 70 further includes a pulse generator comprising a timing device U1 which is employed for providing the pulse output required by most of the remaining garage door opener manufacturers. In the present embodiment, the timing device U1 is a standard "555" timer of a type well known in the art and available from a variety of manufacturers including National Semiconductor as Model LM555. It will be appreciated by those skilled in the art that other types of timing devices may alternatively be employed. Complete details of the structure and operation of the timing device U1 are generally well known to those skilled in the art and, in any event, are readily available from the manufacturer and, therefore, need not be discussed in detail herein. Suffice it to say that when switch S2 is in an open position as shown in FIG. 7, and when switch S1 is in a closed position (not shown) the combination of R1 plus R2 and capacitor C1 establish a timer output signal generally in the form of a square wave having a predetermined maximum voltage and a predetermined maximum voltage pulse width, and a corresponding predetermined minimum voltage with a predetermined minimum voltage pulse width. Because of the Zener diode D1, the maximum output voltage is established by the lesser of the voltage appearing across the input terminals T1 and T2 or 9.1 volts. The values of the resistors R1 and R2 and the capacitor C1 are selected so that the value of the minimum voltage pulse and the pulse width of both the maximum and minimum voltage pulses meet the criteria necessary for operation of a residential garage door opener requiring such pulses. In the present embodiment, R1 has been selected to have a value of 5.11K ohms, R2 has been selected to be 46.4K ohms, and C1 has been selected to be 0.1 microfarads. The selection of these components results in the output voltage across the terminals T1 and T2 as shown in FIG. 8b in which the maximum voltage is 9.1 volts with a pulse width of 5.2 milliseconds and the minimum voltage is 2.4 volts with a pulse width of 0.6 milliseconds. The output signal shown in FIG. 8b, when applied across the actuator output terminals 62, 64, is sufficient for continued operation of residential garage door openers of several different manufacturers.

Figure 8C:
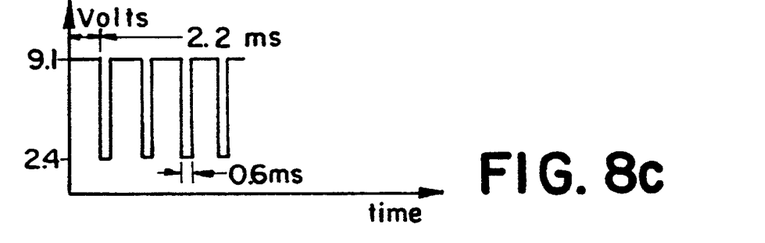

Other manufacturers require a slightly different output voltage. The termination circuit 70 further includes a third resistor R3, in the present embodiment, 26.1K ohms. When switch S2 is closed (not shown), R3 is effectively placed in parallel with R2 to effectively alter the timing of the maximum voltage pulse from 5.2 milliseconds to 2.20 milliseconds as illustrated in FIG. 8c. The output signal illustrated in FIG. 8c is acceptable by other manufacturers of residential garage door openers for continued operation.

Figure 4:
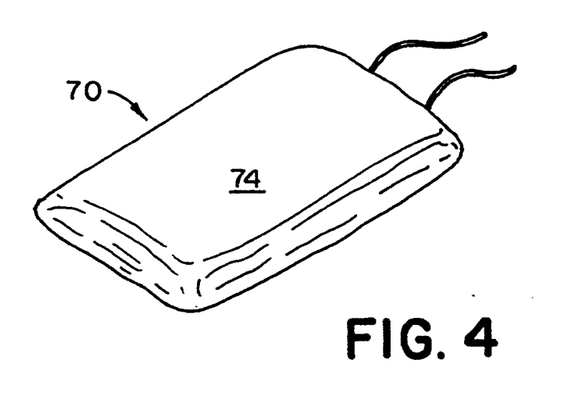
FIG. 4 is a bottom perspective view of a termination circuit employed in the sensing device of FIG. 1.
Figure 5:
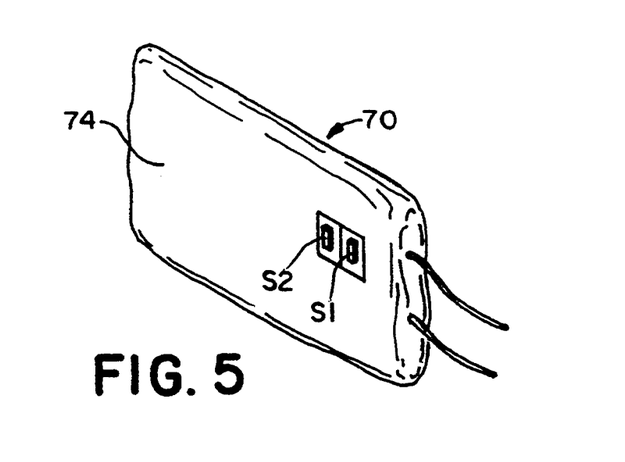
FIG. 5 is a top perspective view of the termination circuit shown in FIG. 4.

FIGS. 4 and 5 show a preferred embodiment of the physical termination circuit 70. Preferably, the components of the termination circuit are installed upon a first side of a standard printed circuit board (not shown) with the switches S1 and S2 extending beyond the printed circuit board. Preferably, the printed circuit board is covered on all sides with a sealing substance 74, such as a potting compound or epoxy in order to effectively seal all of the components against moisture, dirt, etc. Preferably, the switches S1 and S2 extend slightly outwardly beyond the sealing substance 74 as shown in FIG. 5. Preferably, as best shown in FIGS. 2 and 3, the termination circuit 70 is physically located within the first cavity 40 of the sensing edge sheath 28 and is sized and shaped to provide a comfortable fit. It will, of course, be appreciated by those skilled in the art that the termination circuit 70 could be physically located elsewhere as long as the termination circuit 70 is electrically connected to each of the contact members 50, 52 preferably proximate the second end.

From the foregoing description, it can be seen that the present invention comprises a sensing device having a universal interface or termination circuit for cooperation with a plurality of door actuators to provide "fail safe" operation. It will be appreciated by those skilled in the art that changes could be made to the embodiment described above without departing from the broad inventive concepts thereof. It is understood, therefore, that this invention is not limited to the particular embodiment disclosed, but is intended to cover all modifications which are within the spirit and scope of the invention as defined by the appended claims.

I claim:

1. A sensing device for use with a door, movable in a first direction by an actuator to stop or reverse the direction of movement of the door upon a force being applied to the sensing device by an object in a path of movement of the door, the sensing device comprising:
   a sensing edge for being secured to the door, the sensing edge including a generally flexible elongated sheath and a pair of generally parallel, spaced contact members disposed within the sheath, the contact members being electrically connected to the actuator; and
   a termination circuit electrically connected to the contact members for generally continuously generating a predetermined output signal which is applied through the contact members to the actuator to enable operation of the actuator for movement of the door in the first direction whereby, upon the application of a force to the sensing edge, the contact members contact each other to prevent the output signal from the termination circuit from being applied to the actuator thereby causing the actuator to stop or reverse the direction of movement of the door, the termination circuit including a selector means operable by an installer to permit the installer to select the output signal to be either a generally continuous output voltage at a single predetermined voltage level or a generally continuous pulse train formed of a plurality of voltage pulses, each pulse having a predetermined maximum voltage level, a predetermined minimum voltage level and a predetermined pulse width.

2. The sensing device as recited in claim 1 wherein the predetermined voltage level is 9.1 volts.

3. The sensing device as recited in claim 1 wherein the maximum voltage level of the pulses is 9.1 volts and the minimum voltage level of the pulses is 2.4 volts.

4. The sensing device as recited in claim 1 wherein the pulse width of pulses at the maximum voltage level is selectable by an installer.

5. The sensing device as recited in claim 1 wherein the selector means comprises an installer operable switch.

6. The sensing device as recited in claim 1 wherein the termination circuit includes a Zener diode.

7. The sensing device as recited in claim 1 wherein the termination circuit includes a Zener diode connected in parallel with a pulse generator.

8. The sensing device as recited in claim 7 wherein the pulse generator is formed of a timer circuit connected to resistor and capacitor timing components.

9. The sensing device as recited in claim 1 wherein the sensing edge is adapted for being secured to the leading edge of a door.

10. A sensing device for use with a door, movable in a first direction by an actuator to stop or reverse the direction of movement of the door upon a force being applied to the sensing device by an object in a path of movement of the door, the sensing device comprising:
    a sensing edge for being secured to the door, the sensing edge including a generally flexible elongated sheath and a pair of generally parallel, spaced contact members disposed within the sheath, the contact members being electrically connected to the actuator; and
    a termination circuit located within the sensing edge sheath and electrically connected to the contact members for generally continuously generating a predetermined output signal which is applied through the contact members to the actuator to enable operation of the actuator for movement of the door in the first direction whereby, upon the application of a force to the sensing edge, the contact members contact each other to prevent the output signal from the termination circuit from being applied to the actuator thereby causing the actuator to stop or reverse the direction of movement of the door.

11. A sensing device for use with a door, movable in a first direction by an actuator to stop or reverse the direction of movement of the door upon a force being applied to the sensing device by an object in a path of movement of the door, the sensing device comprising:
    a sensing edge for being secured to the door, the sensing edge including a generally flexible elongated sheath and a pair of generally parallel, spaced contact members disposed within the sheath, the contact members being electrically connected to the actuator; and
    a termination circuit electrically connected to the contact members for generally continuously generating a predetermined output signal which is applied through the contact members to the actuator to enable operation of the actuator for movement of the door in the first direction whereby, upon the application of a force to the sensing edge, the contact members contact each other to prevent the output signal from the termination circuit from being applied to the actuator thereby causing the actuator to stop or reverse the direction of movement of the door wherein the contact members each have first and second ends and wherein the first ends of both of the contact members are electrically connected to the actuator and the second ends of each of the contact members are electrically connected to the termination circuit.

12. A termination circuit for connection through a sensing edge to a pair of output terminals of an actuator employed for moving a door in a first direction, the actuator output terminals having a first predetermined open circuit voltage therebetween, the termination circuit, when electrically connected to the actuator output terminals, functioning as an impedance to vary the voltage between the actuator output terminals in a predetermined selectable manner within an actuator operation range extending between a second predetermined voltage and a third predetermined voltage, the actuator being operable for movement of the door in a first direction when the voltage at the actuator terminals is within the actuator operation range, actuator operation being stopped or reversed when the voltage at the actuator output terminals is outside of the actuator operation range.

13. The termination circuit as recited in claim 12 wherein the sensing edge is adapted for being secured to the door and includes a generally flexible elongated sheath and a pair of generally parallel spaced contact members disposed within the sheath, the contact members forming the electrical connection between the termination circuit and the actuator output terminals whereby upon the application of a force to the sensing edge, the contact members contact each other to change the impedance at the actuator output terminals and thereby cause the voltage between the actuator output terminals to be outside of the actuator operation range.

14. The termination circuit as recited in claim 12 wherein the termination circuit comprises a generally continuous impedance so that the voltage between the actuator output terminals is a generally continuous voltage at a predetermined voltage level within the actuator operation range.

15. The termination circuit as recited in claim 12 wherein the impedance provided to the actuator output terminals varies in a predetermined, timed manner so that the voltage between the actuator output terminals varies between the second predetermined voltage and the third predetermined voltage in accordance with a continuously repeating pattern.

* * * * *